(12) United States Patent
Malloy

(10) Patent No.: US 9,527,548 B2
(45) Date of Patent: Dec. 27, 2016

(54) BICYCLE CRANK ARM ASSEMBLY

(71) Applicant: SRAM, LLC, Chicago, IL (US)

(72) Inventor: Christopher Malloy, San Luis Obispo, CA (US)

(73) Assignee: SRAM, LLC, Chicago, IL (US)

( * ) Notice: Subject to any disclaimer, the term of this patent is extended or adjusted under 35 U.S.C. 154(b) by 174 days.

(21) Appl. No.: 14/136,924

(22) Filed: Dec. 20, 2013

(65) Prior Publication Data
US 2015/0175241 A1 Jun. 25, 2015

(51) Int. Cl.
*B62M 3/00* (2006.01)
*B62M 3/16* (2006.01)

(52) U.S. Cl.
CPC ............... *B62M 3/00* (2013.01); *B62M 3/16* (2013.01); *Y10T 74/2164* (2015.01)

(58) Field of Classification Search
CPC ............................... Y10T 74/2164; B62M 3/00
USPC .......................................... 74/594.1; 164/91
See application file for complete search history.

(56) References Cited

U.S. PATENT DOCUMENTS

| | | | | |
|---|---|---|---|---|
| 5,609,070 A * | 3/1997 | Lin | .......................... | B62M 3/16 74/558.5 |
| 5,851,459 A | 12/1998 | Chen | | |
| 6,353,992 B1 * | 3/2002 | Mizobe | ..................... | B21J 5/00 164/91 |
| 6,564,675 B1 * | 5/2003 | Jiang | ..................... | B62K 19/16 74/579 R |
| 7,000,499 B2 | 2/2006 | Valle | | |
| 2001/0049976 A1 * | 12/2001 | Dodman | .................. | B62M 3/00 74/594.1 |
| 2003/0051572 A1 * | 3/2003 | Sramek | .................... | B62M 3/00 74/594.1 |
| 2003/0066383 A1 | 4/2003 | Jiang | | |
| 2004/0200314 A1 * | 10/2004 | Hermansen | ............... | B62M 3/00 74/594.1 |
| 2005/0022625 A1 * | 2/2005 | Nonoshita | .............. | B62K 19/16 74/594.1 |
| 2007/0186719 A1 * | 8/2007 | Ciavatta | ............... | B29C 70/086 74/594.1 |
| 2007/0199403 A1 * | 8/2007 | Ciavatta | .................... | B62M 3/00 74/594.1 |
| 2015/0000459 A1 * | 1/2015 | Nonoshita | .............. | B62K 19/16 74/594.1 |
| 2015/0007688 A1 * | 1/2015 | Feltrin | .................... | B62M 3/00 74/594.1 |

(Continued)

FOREIGN PATENT DOCUMENTS

JP 2008001287 1/2008
TW M286179 U 1/2006

OTHER PUBLICATIONS

EPO Machine Translation of JP 2008001287, Jan. 2008.*

*Primary Examiner* — Vinh Luong
(74) *Attorney, Agent, or Firm* — Milan Milosevic; Lisa Serdynski

(57) ABSTRACT

A bicycle crank arm including a support member. The support member includes a first end sized and shaped to receive a pedal and a second end opposite the first end. The second end is sized and shaped to receive a spindle and a middle portion extends between the first and second ends, wherein the middle portion includes at least one recess. An insert is disposed in each of the one or more recess and an outer shell that covers the support member and insert, wherein the outer shell is made of fiber reinforced composite.

22 Claims, 5 Drawing Sheets

(56) References Cited

U.S. PATENT DOCUMENTS

2015/0266541 A1* 9/2015 Faupel ................ B29C 45/0005
74/594.1

* cited by examiner

BICYCLE CRANK ARM ASSEMBLY

BACKGROUND OF THE INVENTION

This invention relates to bicycles and bicycle crank arms. In particular the invention relates to composite bicycle crank arm assemblies.

SUMMARY OF THE INVENTION

A crank arm is a component for connecting a pedal to a crank axle of a bicycle and for transmitting a pedal force from the pedal to a chain. The crank arm should have high strength in order to prevent failure due to repeated loads from the pedal. On the other hand, the crank arm should not be unnecessarily heavy in order to keep the bicycle as light as possible. Composite materials, generically known as fiber reinforced plastic "FRP," e.g., carbon and other fiber based composites, are advantageous in this respect, providing strong and light construction for the manufacture of modern bicycle cranks. However, composite construction is typically costly.

The invention provides, in one aspect, a hybrid crank arm that utilizes a full length support member and a composite overwrap to achieve sufficient strength. The support member is pocketed between the ends of the crank arm and the pocket or pockets are filled with a relatively low density insert. This support member and insert subassembly is then overwrapped with composite material and cured to form a structurally bonded assembly.

One aspect of the invention is a bicycle crank arm including a support member. The support member includes a first end sized and shaped to receive a pedal and a second end opposite the first end. The second end is sized and shaped to receive a spindle and a middle portion extends between the first and second ends, wherein the middle portion includes at least one recess. An insert is disposed in the recess and an outer shell that covers the support member and insert, wherein the outer shell is made of fiber reinforced composite material, such as fiber reinforced plastic, for example.

Other aspects of the invention provide a bicycle crank arm wherein the support member is a one-piece construction. The middle portion may include a first flange and a second flange spaced apart from the first flange and a connecting portion extending between the first and second flanges. The connecting portion may be positioned between an inboard side of the crank arm and an outboard side of the crank arm. The connecting portion may be positioned about equally between the inboard side of the crank arm and the outboard side of the crank arm. The connecting portion may be positioned closer to an outboard side of the crank arm than an inboard side of the crank arm. The outer shell may be thinner on the outboard side of the crank arm. The outer shell may be thinner at the first and second ends compared to between the first and second ends. The support member may be metallic. The support member may include an aluminum material. The support member may include a non-metallic material. The insert may be less dense than the support member. The insert may have a volume that is about that of the recess. The insert may have a volume that is greater than that of the recess. The insert may be a foamed polymeric material such as polyurethane foam. The insert may be a wax material. The insert may have a density from about 0.1 to about 0.9 g/cm$^3$. The insert may have a density of about 0.3 g/cm$^3$.

These and other features and advantages of the present invention will be more fully understood from the following description of one or more embodiments of the invention, taken together with the accompanying drawings.

DETAILED DESCRIPTION OF THE PREFERRED EMBODIMENTS

Embodiments of the invention will herein be described with reference to the drawings. Moreover, the terms employed herein refer to bicycle components conventionally mounted to a bicycle and with the bicycle oriented and used in a standard fashion unless otherwise indicated.

FIGS. 1-4 and 5A show a crank arm 10 according to an embodiment of the invention. While the crank arm 10 illustrated is a non-drive side crank arm, the same construction could be employed on the drive side of a bicycle by providing, for example, additional and well-known structure to attach a chainring carrier and/or a chainring thereto.

The crank arm 10 includes a first end 12, which is distally located, to which a pedal can be affixed and a second end 14, which is proximally located, to attach the crank arm to a spindle or the like (not shown) in a conventional manner. The term spindle, in this application, should be considered any type of axle or shaft-like element of a bottom bracket on which the crank arms are mounted.

Figure 1:
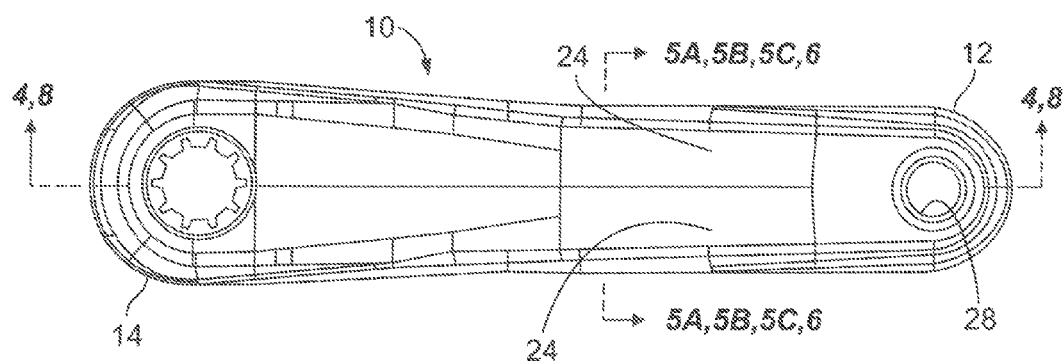
FIG. 1 is an outside view of a crank arm according to the invention.
Figure 2:
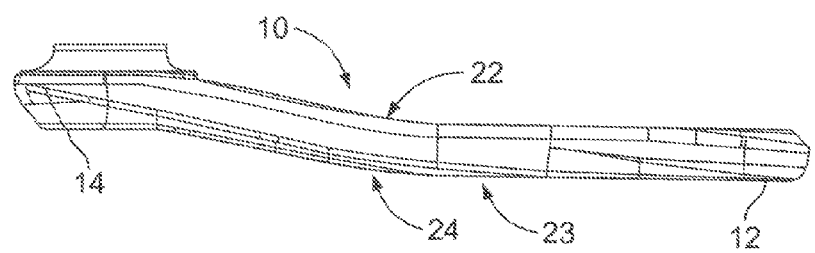
FIG. 2 is a top view of a crank arm according to the invention.
Figure 3:
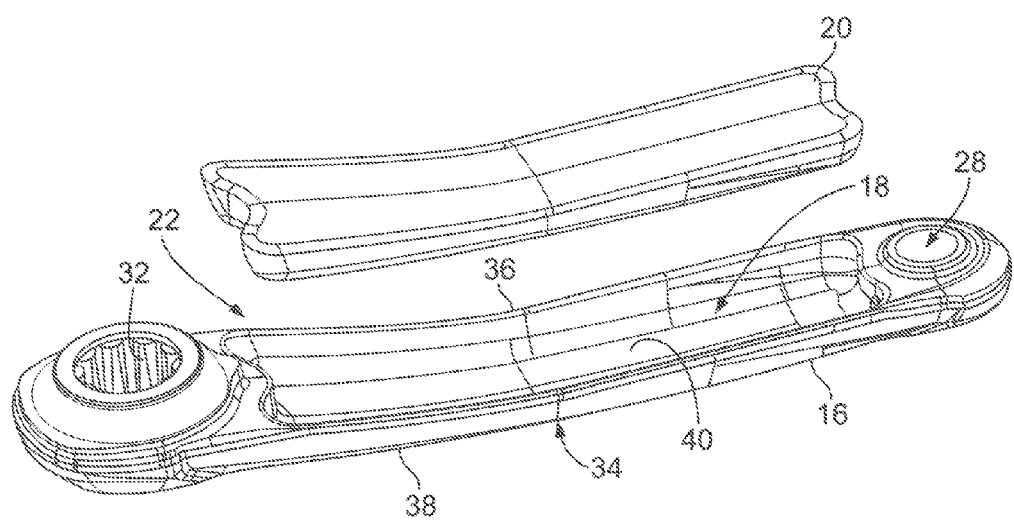
FIG. 3 is an exploded perspective view of part of the crank arm of FIG. 1 according to an embodiment of the invention.
Figure 4:
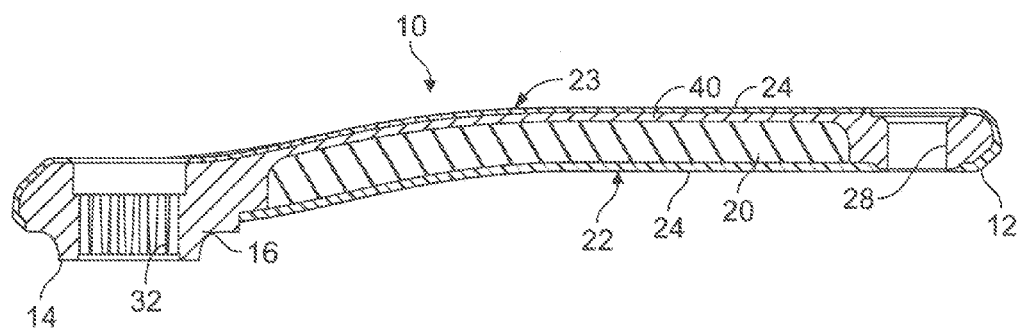
FIG. 4 is a lengthwise cross sectional view of the crank arm of FIG. 1 along line 4-4.

FIG. 3 shows two of the main components of the crank arm 10. The crank arm 10 includes a full-length support member 16, which is a rigid, mostly internal element, with a pocket or recess 18 formed therein. An insert 20, which may be a relatively lower density element, is disposed within the recess. In this embodiment, the recess 18 is formed in the inboard side 22 of the support member 16 of the crank arm 10, i.e., wherein the inboard side is the side of the crank arm facing the bicycle frame when mounted on the spindle. The opposite configuration is also contemplated by the invention, i.e., wherein the recess 18 is formed on the outboard side 23.

FIGS. 4, 5A-C and 10 show cross sections (lengthwise and transverse, respectively) of the crank arm 10 of an embodiment of the invention. Three main components form the structure of the crank arm 10. These components are the support member 16, the insert 20 and an outer shell 24.

The support member 16 has three main portions. The first end 12 includes a threaded opening 28. The threaded opening 28 is sized and shaped to receive the threads of a pedal (not shown). The second end 14, opposite the first end 12, is sized and shaped to receive a spindle (not shown). For example, the second end 14 may include an opening provided with splines 32 or the like for securing the crank arm 10 to the spindle. The exact configuration of the splines 32 is dependent upon the configuration of the spindle, which is a well-known component.

Extending between the first end 12 and the second end 14 is a middle portion 34, which may be in the form of a rib or beam. The middle portion 34 includes a first flange 36 and a second flange 38 and a connecting portion 40, which may be in the form of a web, which extends between the first and second flanges.

The middle portion 34 may generally be in the form of a "C". The connecting portion 40 may be oriented to the outboard side 23 of the crank arm 10 when mounted to a spindle of a bicycle, i.e., facing away from the bicycle frame. If the connecting portion 40 is oriented to the outboard side of the crank arm 10, the recess 18 is formed in and opens to the inboard side 22 of the middle portion 34.

Alternatively, the connecting portion 40 may be oriented to the inboard side 22 of the crank arm. If the connecting portion 40 is oriented to the inboard side 22 of the crank arm 10, the recess 18 is formed in and opens to the outboard side 23 of the middle portion 34.

Figure 8:
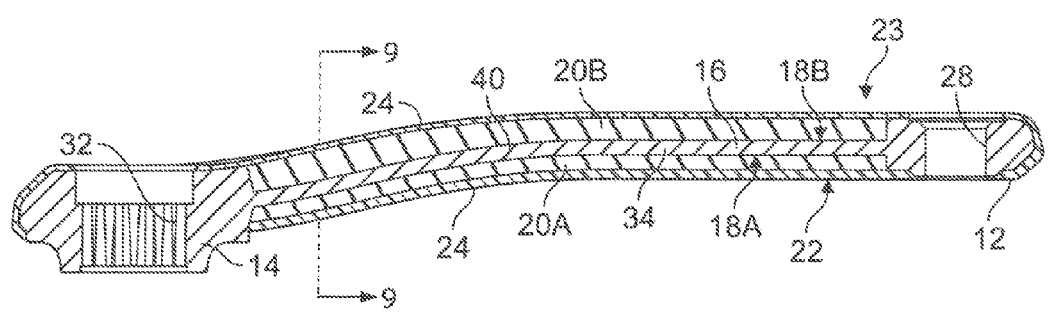
FIG. 8 is a lengthwise cross sectional view of a crank arm according to a second embodiment of the invention taken along a line like that shown in FIG. 1 as 8-8.
Figure 9:
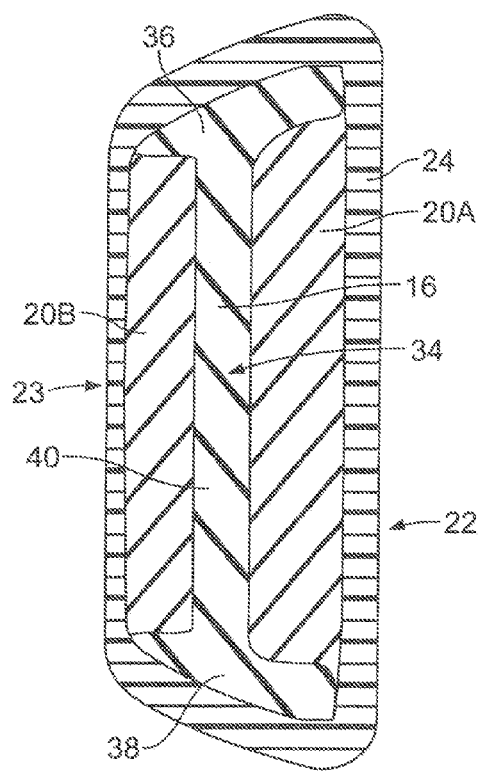
FIG. 9 is a transverse cross sectional view of the crank arm of FIG. 8 along line 9-9.

In a further embodiment, illustrated in FIGS. 8 and 9, the connecting portion 40 may be generally centrally positioned, i.e., about equally spaced between the inboard and outboard sides 22, 23, and define an inside recess 18A and an outside recess 18B. Each of the inside and outside recesses 18A, B may include a respective insert 20A, 20B disposed therein. In this embodiment, the thickness of the outer shell 24 may be the same on the inboard side 22 and the outboard side 23 of the crank arm 10.

A number of materials can be used for the support member 16. The support member 16 may be formed of a metallic material and manufactured using methods such as forging or casting. Aluminum and alloys thereof are a particularly good choice due to low weight and high strength. In an embodiment where the support member 16 is formed, for example, of an aluminum alloy, the first end 12, the second end 14 and middle portion 34 can be formed as a single-piece, i.e., as a one-piece construction. Other suitable materials of the support member 16 include steel, titanium, scandium, beryllium, magnesium, and other similar suitable materials, alloys and combinations thereof.

The middle portion 34 of the support member 16 may be made of bulk chopped fiber reinforced composite, such as bulk molding compound (BMC) or sheet molding compound (SMC), by any process suitable for the desired material. In this embodiment, the first end 12 and the second end 14 may be separate metallic inserts that are bonded to and/or mechanically interlocked with the composite middle portion 34 or made of fiber-reinforced composite or plastic material, as is known in the art.

The support member 16 may be designed such that it by itself cannot structurally sustain the load applied to a typical crank arm in order to minimize the weight of the support member. The support member 16 allows for less composite material to be used in the outer shell 24 compared to a more traditional composite crank construction, which reduces the overall cost to manufacture a crank arm 10 of the invention.

The support member 16, between the first end 12 and the second end 14, i.e., the middle portion 34, may be formed in the shape of a "C" in one embodiment, and its wall thickness may be less than about three (3) millimeters to minimize weight. A "C" shaped support member 16 is shown in FIGS. 5A-C.

The wall thickness of the connecting portion 40 of the middle portion 34 may be about 1.5-2 millimeters and the upper and lower flanges 36, 38 may be more than about 1.5 millimeters, for example, to about 3 millimeters. It will be understood that the exact thickness of the various portions will be dependent upon, at least in part, the material used in the part and the manufacturing process. In one example, the support member 16 may be forged and further machined to a lesser wall thickness that current forging processes permit. The combination of the support member 16 and the bonded composite outer shell 24 are sized and shaped to produce a closed section that will withstand the loads seen in use.

Figure 5A:
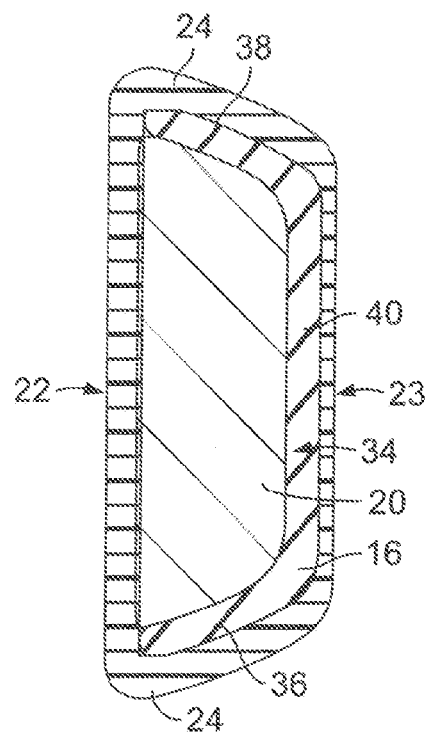
FIGS. 5A-5C are various embodiments of a crank arm through a transverse cross sectional view as indicated in FIG. 1 along lines 5A-5C-5A-5C.

The insert 20 is "D"-shaped in the above-illustrated embodiment shown in FIG. 5A and may be a preformed element. In other words, the insert 20 may be manufactured into its final form and then positioned within the recess 18 of the support member 16. In this embodiment, the insert 20 may be shaped and sized to fill, or slightly overfill, the recess 18. The insert 20 may be shaped and sized to almost fill the recess 18. The insert 20 is mainly used to fill the center middle portion of the crank arm defined by the recess 18 with a low density material to reduce the overall crank arm weight. The insert 20 may also be configured to provide the necessary support required to consolidate the adjacent outer composite material forming the outer shell 24 during the curing process. In this manner, the exact final shape of the crank arm 10 can be controlled and the function of the insert 20 in supporting the outer shell 24 during manufacturing is predictable.

Figure 5B:
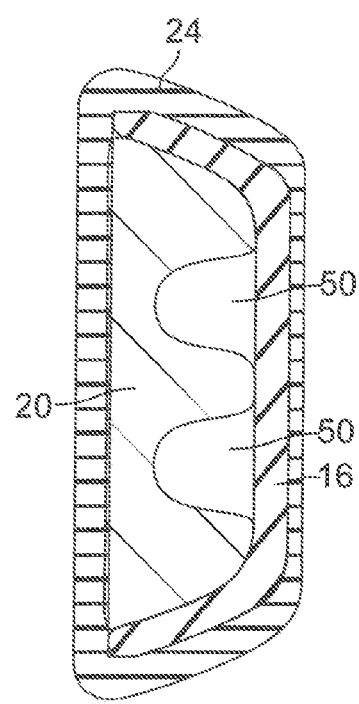
Figure 5C:
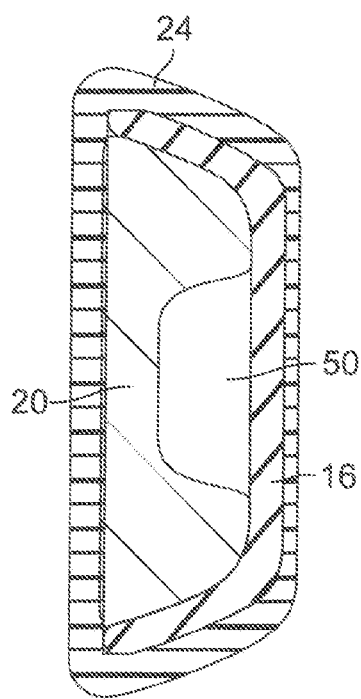
Figure 10:
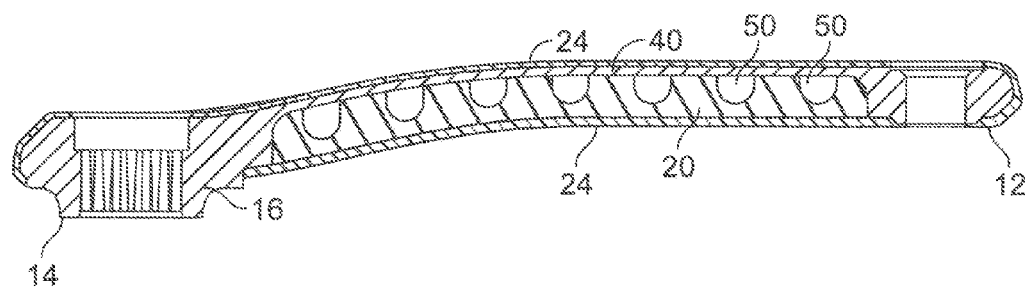
FIG. 10 is an embodiment of a crank arm with a further embodiment of an insert.

FIGS. 5B and C and FIG. 10 show inserts 20 that have one or more voids or pockets 50. The pockets 50 may be open to the recess 18 so that the shell 24 is supported. Pockets 50 may be round or non-round and may have a longitudinal axis that is aligned transversely or non-transversely.

The material of the insert 20 may include many materials, but polyurethane foam is one preferred material because it can readily be cast to net shape and is low in density. Other types of foam can be used such as Rohacell®, a polymethacrylimide. Another example is a polymer-based honeycomb material. The insert 20 could also be made of a more rigid material like wax, or a low melt metal alloy. In some embodiments, the insert 20 may be removed after the outer shell 24 is overwrapped thereabout and cured, which leaves a hollow void in the form of the recess 18. Polyurethane foam is beneficial as an insert material, since it can be made slightly larger than the recess 18 to provide support for the outer shell 24 and will compress as needed. A wax insert will expand slightly when heated to provide support in the same fashion.

Currently, a density about 0.1-0.9 $g/cm^3$ (where "g" is grams and "cm" is centimeters) is desirable for the insert 20. A density about 0.3 $g/cm^3$ is preferred. Foam densities can be as low as 0.03 $g/cm^3$. If the insert 20 is removable, as in the wax example, the density could be higher without negative effects due to higher weight. Similar to a honeycomb structure, the invention contemplates a ribbed structure with a skin on the one side that faces the outer shell.

The support member/insert subassembly 16, 20 is covered with fiber reinforced composite material, such as FRP, to form a composite outer shell 24 largely covering the subassembly. In the depicted embodiment, the shell 24 covers a majority of the outside of the crank arm 10. In other embodiments, the shell 24 may cover all of the outside surface of the crank arm 10 or a minority of the crank arm. The assembly 16, 20, 24 is then cured together to form a structurally bonded crank arm 10. The result is a lighter weight composite crank that is inexpensive to manufacture.

Different forms or combinations of fiber reinforced resin can be used to construct the composite outer shell 24. Unidirectional or woven "prepreg" ("pre-impregnated" composite fibers) is contemplated by the invention, to take advantage of the ability to control the fiber direction and resin content, but materials such as sheet molding compound (SMC) or bulk molding compound (BMC) could also be utilized. Fiber material used in the composite may include one or more of carbon fiber, glass fiber, aramid fiber and other suitable fibers.

Figure 7:
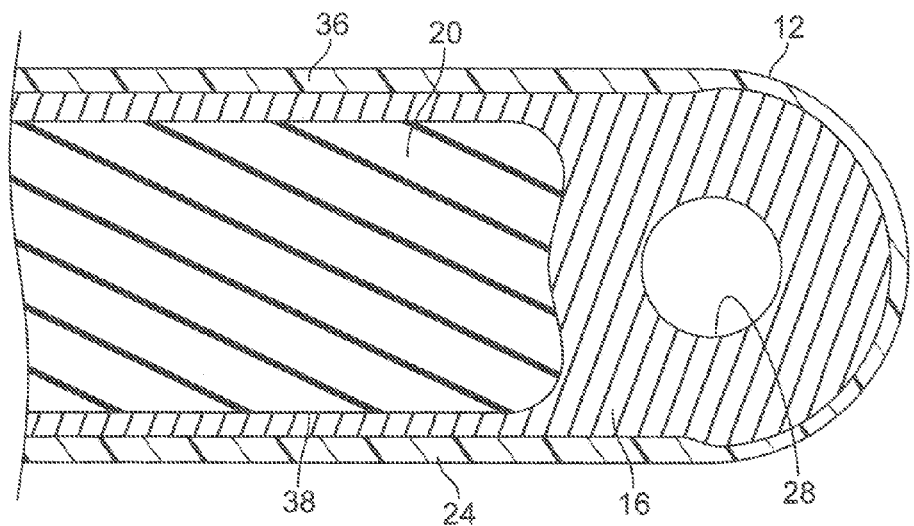
FIG. 7 is a partial cross sectional view of the distal end of the crank arm of FIG. 1.

As can be seen in FIGS. 5A-C, the composite shell can be thinner in the area abutting the connecting portion 40 of the support member "C" portion since locally the support member provides significant structure by itself. The thickness of composite material can be reduced on the ends 12, 14, as shown in FIG. 7, because the structure of the ends 12, 14 provide a significant amount of support. Structurally there is a lesser amount of load at the ends 12, 14 of the crank arm 10 so the thickness of the composite shell locally can be reduced to save additional material. Less composite material also reduces the manual layup time, which further reduces the cost to manufacture.

The composite outer shell 24 is initially made up of multiple layers of uncured fiber reinforced resin. These layers can be strategically overlapped with each other and the "C" section geometry of the support member 16 to achieve more structural interconnectivity. The large contact area between the support member 16 and the composite outer shell 24 maximizes the bond area of the fiber reinforced resin to provide for superior structural connection to the support member.

Figure 6:
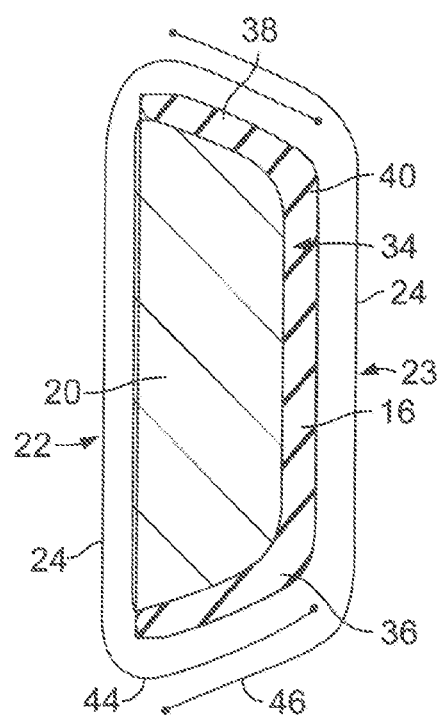
FIG. 6 is a transverse cross sectional view of the crank arm of FIG. 1 showing the orientation of the layers of an outer shell along line 6-6 of FIG. 1.

Referring to FIG. 6, the outer shell 24 may be formed from two main layers, an inside shell layer 44 that overlays and spans the inboard side 22 against the insert 20 and upper and lower flanges 36, 38, and an outside shell layer 46 that overlays the outboard side 23 against the middle portion 34 and the parts of the inside shell layer that overlays and spans the upper and lower flanges 36, 38. The inside shell layer 44 and outside shell layer 46 may each be made of multiple layers of FRP material. In one embodiment, the outside shell layer 46 has less layers of FRP material than the inside shell layer 44.

While this invention has been described by reference to a particular embodiment, it should be understood that numerous changes could be made within the spirit and scope of the inventive concepts described. Accordingly, it is intended that the invention not be limited to the disclosed embodiment, but that it have the full scope permitted by the language of the following claims.

The invention claimed is:

1. A bicycle crank arm, comprising:
   a support member including:
   a first end sized and shaped to receive a pedal,
   a second end opposite the first end, the second end sized and shaped to receive a spindle, and
   a middle portion extending between the first and second ends, the middle portion including at least one recess, a first flange extending between the first and second ends, a second flange spaced apart from the first flange and extending between the first and second ends and a connecting portion extending between the first and second flanges and between the first and second ends, the first and second flanges and the connecting portion forming sides of the at least one recess;
   an insert disposed in the recess; and
   an outer shell overwrapping the middle portion, and the insert the outer shell made of fiber reinforced composite and comprising an outside shell layer overlaying an outboard side of the bicycle crank arm and an inside shell layer that overlays an inboard side of the bicycle crank arm.

2. The bicycle crank arm of claim 1, wherein the support member is a one-piece construction.

3. The bicycle crank arm of claim 1, wherein the outer shell includes a fiber reinforced plastic material including one or more of carbon fiber, glass fiber and aramid fiber.

4. The bicycle crank arm of claim 1, wherein a transverse cross section of the connecting portion is one of generally "C" shaped and generally "I" shaped.

5. The bicycle crank arm of claim 1, wherein the connecting portion is positioned between the inboard side of the crank arm and the outboard side of the crank arm.

6. The bicycle crank arm of claim 5, wherein the connecting portion is positioned equally between the inboard side of the crank arm and the outboard side of the crank arm.

7. The bicycle crank arm of claim 1, wherein the connecting portion is positioned closer to the outboard side of the crank arm than the inboard side of the crank arm.

8. The bicycle crank arm of claim 7, wherein the outer shell is thinner on the outboard side of the crank arm.

9. The bicycle crank arm of claim 1, wherein the connecting portion is positioned closer to the inboard side of the crank arm than the outboard side of the crank arm.

10. The bicycle crank arm of claim 9, wherein the outer shell is thinner on the inboard side of the crank arm.

11. The bicycle crank arm of claim 1, wherein the outer shell is thinner at the first and second ends of the crank arm compared to the outer shell adjacent the middle portion.

12. The bicycle crank arm of claim 1, wherein the support member is metallic.

13. The bicycle crank arm of claim 12, wherein the support member includes an aluminum material.

14. The bicycle crank arm of claim 1, wherein the support member includes a non-metallic material.

15. The bicycle crank arm of claim 1, wherein the insert is less dense than the support member.

16. The bicycle crank arm of claim 15, wherein the insert has a density from 0.03 to 0.9 $g/cm^3$.

17. The bicycle crank arm of claim 16, wherein the insert has a density of 0.3 $g/cm^3$.

18. The bicycle crank arm of claim 1, wherein a volume of the insert is substantially equal to a volume of the recess.

19. The bicycle crank arm of claim 1, wherein a volume of the insert is greater than a volume of the recess.

20. The bicycle crank arm of claim 1, wherein the insert is a foamed polymeric material.

21. The bicycle crank arm of claim 20, wherein the insert is a polyurethane foam.

22. The bicycle crank arm of claim 1, wherein the insert is a wax or metallic material.

* * * * *